(12) United States Patent  (10) Patent No.: US 6,705,546 B2
Bosch  (45) Date of Patent: *Mar. 16, 2004

(54) WHEELED SUPPORT ASSEMBLY

(75) Inventor: Corey R. Bosch, Grace Township, Chippewa County, MN (US)

(73) Assignee: Redball, LLC, Benson, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 10/207,370

(22) Filed: Jul. 30, 2002

(65) Prior Publication Data

US 2004/0021004 A1 Feb. 5, 2004

(51) Int. Cl.⁷ .................. A01G 25/09; E01C 19/16; E01H 3/02; B05B 1/20; B60G 3/12
(52) U.S. Cl. .................. 239/172; 239/159; 280/781; 280/124.128
(58) Field of Search .................. 239/172, 159, 239/264, 263.2; 280/781, 124.128

(56) References Cited

U.S. PATENT DOCUMENTS

| | | | |
|---|---|---|---|
| 1,253,089 A | 1/1918 | Owens | |
| 2,596,035 A | 5/1952 | Love | 180/22 |
| 3,184,250 A | 5/1965 | Bobrowski | 280/81 |
| 3,336,044 A | 8/1967 | Hatten | 280/104.5 |
| 3,556,404 A * | 1/1971 | Walker | 239/167 |
| 3,574,408 A * | 4/1971 | Ronning | 301/132 |
| 3,858,761 A | 1/1975 | O'Dell | 222/178 |
| 4,232,616 A | 11/1980 | van der Lely | 111/7 |
| 4,519,460 A | 5/1985 | Gust | 172/176 |
| 5,890,445 A | 4/1999 | Ridgley | 111/119 |

* cited by examiner

*Primary Examiner*—Michael Mar
*Assistant Examiner*—Darren Gorman
(74) *Attorney, Agent, or Firm*—William L. Huebsch

(57) ABSTRACT

An improved wheeled support assembly for a trailer spraying device including a tank for liquid to be sprayed mounted on a main frame of the device, and a spray assembly adapted to spray liquid from the tank in a predetermined pattern through a spray boom projecting from both sides of the frame. Two large wheels are mounted on each side of the main frame by a rigid wheel adapting frame fixed to the main frame that comprises two elongate support members each spaced from a different one of the sides of the main frame to provide wheel clearance spaces between those elongate support members and the sides of the main frame. Included are two elongate pivot members, and sleeve bearing on each of the pivot members mounting two of the wheels on the pivot member for rotation about parallel axes transverse of the pivot member, one of which wheels being mounted on a first end portion and on one side of the pivot member, and the other of the wheels being mounted on a second opposite end portion of the pivot member and on its opposite side; together with an assembly for mounting the center portion of each of the pivot members on a different one of the elongate support members for pivotal movement of the pivot member about an axis parallel to the axes about which the wheels are rotatably mounted with one of the said wheels in the wheel clearance space, and the other of the wheels on the side of the elongate support member opposite the main frame.

12 Claims, 3 Drawing Sheets

WHEELED SUPPORT ASSEMBLY

FIELD OF THE INVENTION

The present invention relates to trailer spraying devices of the type used in agriculture including a tank mounted on a frame of the device for holding a large amount liquid to be sprayed, a spray assembly mounted on the frame that is adapted to spray liquid from the tank in a predetermined pattern through a spray boom, and wheels rotatably mounted on the frame by which the frame is supported, which trailer spraying device is adapted to be coupled to a farm tractor and towed across a field as the liquid is sprayed from the device; the present invention being particularly related to the structure for mounting the wheels on the frame of such a trailer spraying device.

BACKGROUND

Well known in the prior art are trailer spraying devices of the type used in agriculture including a tank mounted on a frame of the device for holding a large amount liquid to be sprayed, a spray assembly mounted on the frame that is adapted to spray liquid from the tank in a predetermined pattern through a spray boom mounted on the frame that projects a long distance on both sides of the frame (e.g., up to 60 feet or 18 meters in both directions from the center of the frame), and wheels rotatably mounted along the sides of the frame by which the frame is supported. Such trailer spraying devices are adapted to be coupled to a drive assembly such as a tractor and to be towed across a field as the liquid is sprayed from the device through the spray boom. The tanks on such trailer spraying devices can carry a large amount of liquid (e.g., 1,200 to 1,600 gallons) which, together with the spraying assembly and other portions of the trailer spraying device, can cause the trailer spraying device to be very heavy (e.g., weigh over 18,000 pounds). Such trailer spraying devices have used two wheels, one on each side of the frame in the manner of a two wheel cart, which wheels have been very large in diameter (e.g., at least 60 inches (152 cm) or larger) and included large tires with lugs on their peripheries (e.g., 14.9R46 or 320/85 R38 tires) both (1) to provide the needed weight carrying capacity, and (2) to minimize the effect of passing over irregularities in a field, such as small ditches caused by erosion or narrow ridges, because a wheel dropping into or moving over such an irregularity can cause the projecting end portions of the spray boom to move up or down sufficiently to make an undesirable change in spray pattern being produced by the trailer spraying device. Despite the large size of such wheels, however, the weight of some such trailer spraying devices too easily causes the wheels to sink into soft earth, and ditches or ridges still cause an unwanted amount of pitching of the spray boom as the wheels pass through or over them.

DISCLOSURE OF THE INVENTION

The present invention provides an improved wheeled support assembly for a trailer spraying device of the type used in agriculture described above that includes a tank mounted on a main frame of the device for holding a large amount of liquid (e.g., 1,200 or 1,600 gallons) to be sprayed, and a spray assembly mounted on the main frame that is adapted to spray liquid from the tank in a predetermined pattern through a spray boom mounted on the main frame, which spray boom projects a long distance from both sides of the main frame (e.g., up to 60 feet or 18 meters in both directions from the center of the main frame). The improved wheeled support assembly according to the present invention provides greater weight carrying capacity by including two large wheels on each side of the main frame and also mounts those two wheels in a manner that reduces unwanted pitching of the spray boom as the wheels pass through ditches or over ridges compared to the pitching that occurs using only a single large wheel of the same size on each side of the main frame.

The wheeled support assembly according to the present invention includes a rigid wheel adapting frame fixed to the main frame, which wheel adapting frame comprises two elongate support members each spaced from a different one of the sides of the main frame to help provide wheel clearance spaces between those elongate support members and the sides of the main frame, each of which spaces is adapted to receive one of the wheels. The wheeled support assembly also includes two elongate pivot members, and means on each of the pivot members mounting two of the wheels on the pivot member for rotation about parallel axes transverse of the pivot member, one of which wheels is mounted on a first end portion and on one side of the pivot member, and the other of which wheels is mounted on a second opposite end portion of the pivot member and on its opposite side, with the parallel axes about which the wheels are rotatably mounted being spaced by a distance less than the diametrical dimensions of the wheels; together with means for mounting the center portion of each of the pivot members on a different one of the elongate support members for pivotal movement of the pivot member about an axis parallel to the axes about which the wheels are rotatably mounted with one of the wheels in the wheel clearance space, and the other of the wheels on the side of the elongate support member opposite the main frame.

Thus, the wheeled support assembly according to the present invention both provides two large diameter wheels (e.g., at least 48 inch or 122 cm diameter and preferably at least 60 inch or 152 cm diameter) on each side of the main frame to help distribute the weight of the trailer spraying device, and allows the axes of the wheels to be horizontally spaced a distance less than the diametrical dimension of the wheels (e.g., a distance in the range of 20 to 30 inches or 51 to 76 cm such as 24 inches or 61 cm), which allows the large wheels on the pivot members to move into and out of ditches or over ridges while restricting up or down movement of the projecting end portions of the spray boom and thereby restricting undesirable changes in the spray pattern being produced by the trailer spraying device. Also, mounting the large wheels on opposite sides of each pivot member causes the wheels to move along axially spaced paths which restricts localized compaction of the field along the paths of the wheels, and balances the load on the bearing by which the center portion of the pivot member is mounted on the elongate support member.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
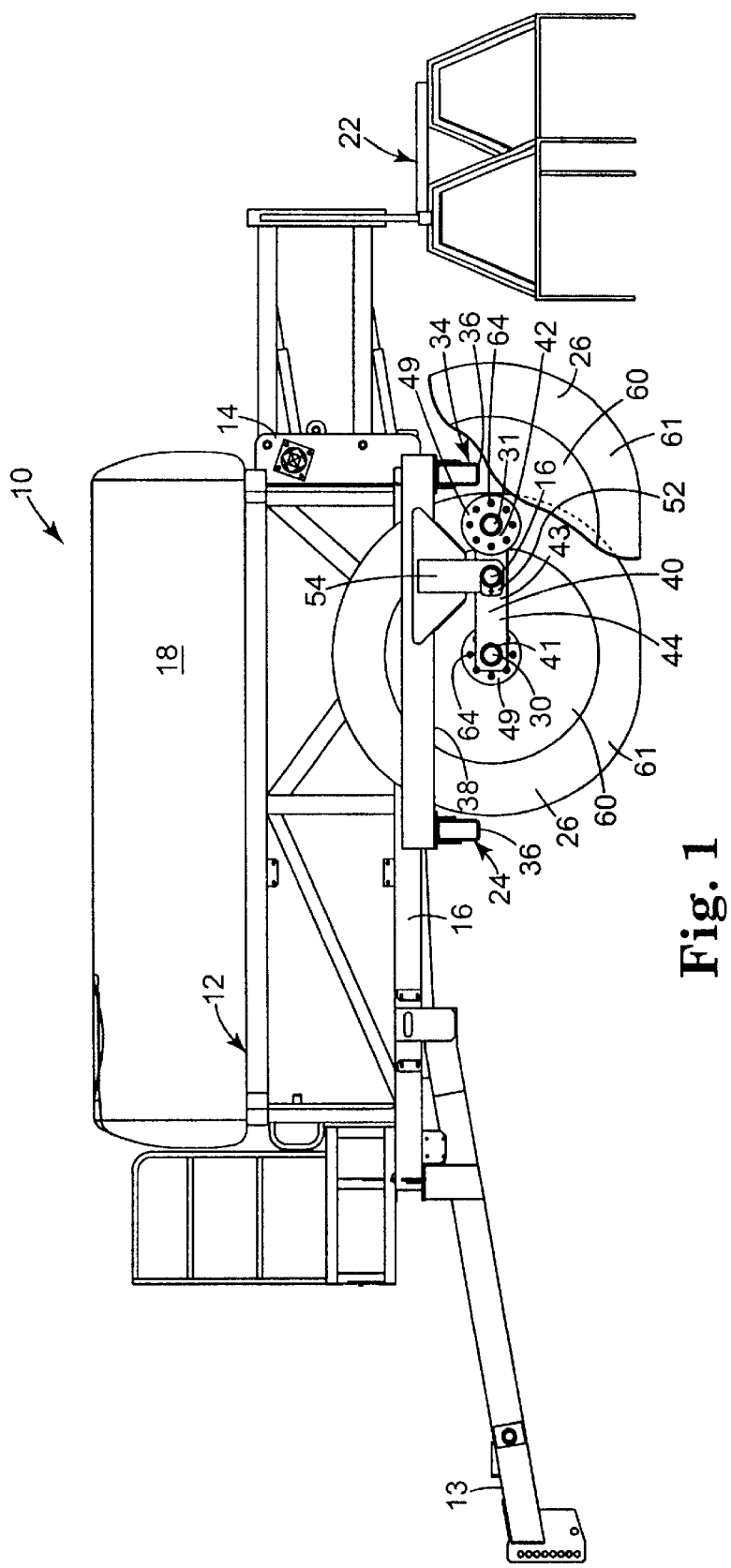
FIG. 1 is a side view of a trailer agricultural spraying device including a wheeled support assembly according to the present invention in which a fragment of a wheel has been removed to show detail.

Referring now to the drawing, there is shown a trailer spraying device 10 according to the present invention. Like the trailer spraying device described in U.S. Pat. No. 6,047,901, the content whereof is incorporated herein by reference, the trailer spraying device 10 comprises a main frame 12 having front and rear ends 13 and 14, and opposite sides 16 extending in a first direction between those ends 13 and 14, a large main tank 18 mounted on the main frame 12 for storing a large quantity of liquid (e.g., a 1,200 or 1,600 gallon tank for storing liquid containing herbicides and/or fertilizer); a spray assembly mounted on the main frame 12 including a spray boom 22 mounted on the rear end 14 of the main frame 12 by the support assembly described in U.S. Pat. No. 6,047,901 that projects from the opposite sides 16 of the main frame 12 (e.g., projects up to 60 feet or 18 meters in both directions from the center of the main frame 12), and means on the main frame 12 described in U.S. Pat. No. 6,047,901 for spraying liquid from the tank 18 through the spray boom 22 in a predetermined pattern. Means are provided on the main frame 12 adapted to connect the front end 13 of the main frame 12 to a drive assembly such as a farm tractor (not illustrated) that is adapted to tow the trailer spraying device 10 over the surface of a field.

Figure 2:
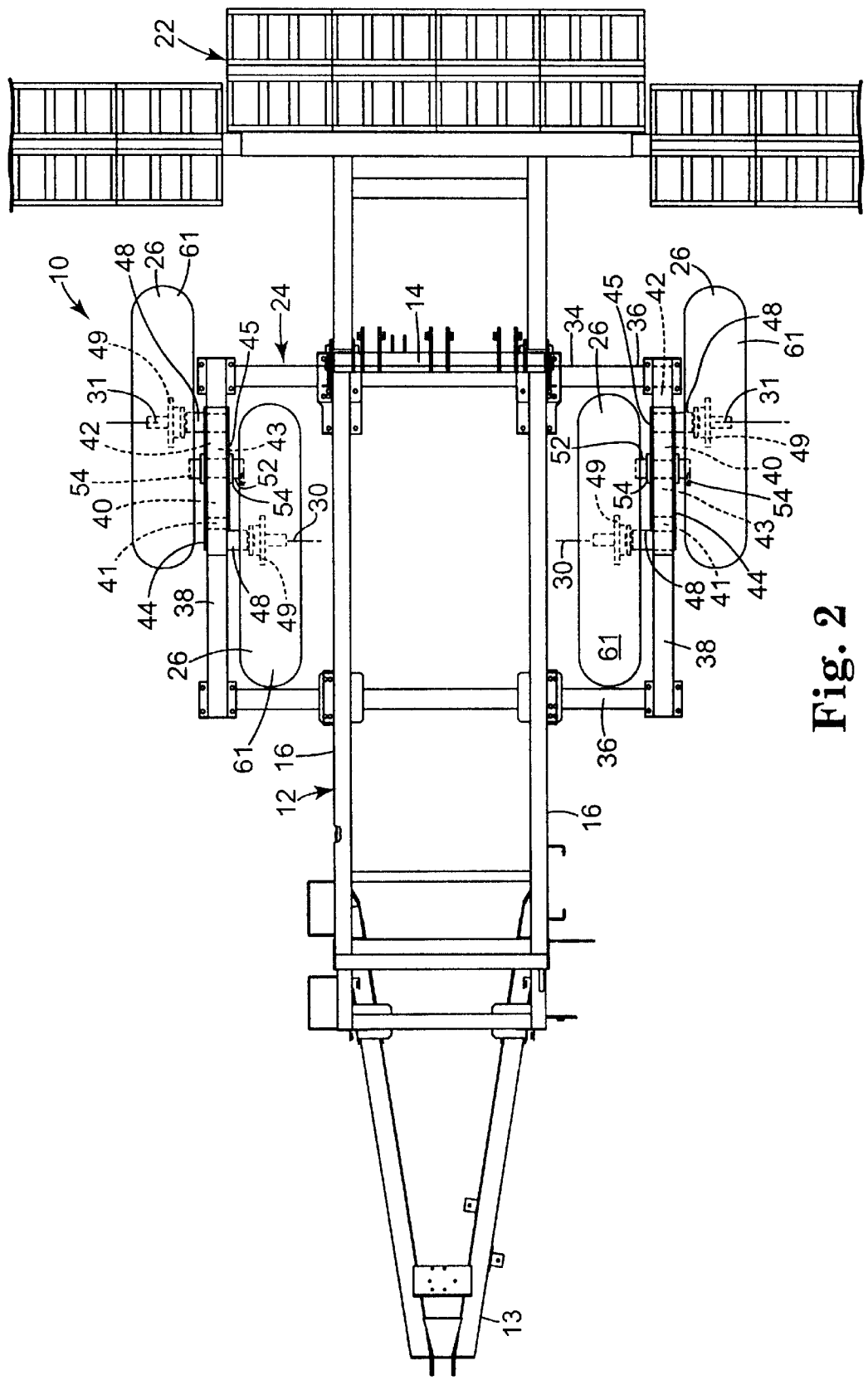
FIG. 2 is a top view the trailer agricultural spraying device of FIG. 1 from which a tank has been removed to show detail.

The trailer spraying device 10 includes a wheeled support assembly 24 according to the present invention that, unlike the two wheeled support assembly described in U.S. Pat. No. 6,047,901, includes four wheels 26 having large predetermined diametrical dimensions (e.g., at least 48 inches or 122 cm, and preferably at least 60 inches or 152 cm), and mounting means for mounting two of the wheels 26 along each of the opposite sides 16 of the main frame 12 for rotation about axes 30 and 31 at right angles to the first direction between the front and rear ends 13 and 14 of the main frame 16 with the peripheries of the wheels 26 positioned to contact the surface of a field over which the trailer spraying device 12 is positioned so that the wheels 26 support the main frame 16 high above the surface of the field (e.g., at least 27 inches above the field) and can rotate to facilitate movement of the trailer spraying device 10 over the field in the first direction. The mounting means includes a rigid rectangular wheel adapting frame 34 fixed or bolted to the main frame 12. The wheel adapting frame 34 comprising two transverse support members 36 (e.g., ⅜ inch thick wall, 4 inch by 8 inch rectangular steel tubes) fixed or bolted to the underside of and projecting from the opposite sides 16 of the main frame 12; and two elongate support members 38 (e.g., ⅜ inch thick wall, 4 inch by 6 inch rectangular steel tubes) each fixed or bolted as by U-bolts 39 to and extending between distal ends of the two transverse support members 36, which elongate support members 38 are each spaced from a different one of the sides 16 of the main frame 12 to provide wheel clearance spaces between the transverse support members 36, the elongate support members 38, and the sides 16 of the main frame 12, each of which wheel clearance spaces is adapted to receive one of the wheels 26. The mounting means also includes two elongate pivot members 40 (e.g., ⅜ inch thick wall, 4 inch by 6 inch rectangular steel tubes). Each of the pivot members 40 has spaced first and second end portions 41 and 42, a central portion 43 between those end portions 41 and 42, and opposite sides 44 and 45. Two conventional wheel spindles 48 mounted on each of the pivot members 40 support roller bearings mounting conventional hubs 49 of two of the wheels 26 on the pivot member 40 for rotation about parallel axes transverse of the pivot member 40. One of the wheels 26 is mounted on the first end portion 41 on one side 44 of the pivot member 40, and the other of the wheels 26 is mounted on the second end portion 42 on the other side 45 of the pivot member. The parallel axes about which the wheels 26 are rotatably mounted by the wheel spindles are spaced by a distance less than the diametrical dimensions of the wheels 26 so that, as viewed in a vertical plane as illustrated in FIG. 2, portions of the two wheels 26 on each pivot member 40 overlap each other.

Means in the form of a cylindrical pivot shaft 52 extending between spaced parallel support plates 54 fixed to the each of the support members 38 and depending from the opposite sides and bottom surface of the support member 38 are provided for mounting the central portion 43 of each of the pivot members 40 on a different one of the elongate support members 38 for pivotal movement of the pivot member 40 about an axis parallel to the parallel axes about which the wheels 26 are rotatably mounted with one of the wheels 26 in the wheel clearance space, and with the other of the wheels 26 on the side of the elongate support member 38 opposite the main frame 12. The wheels 26 on the side of the elongate support member 38 opposite the main frame 12 are spaced from the wheels 26 in the wheel clearance spaces toward the rear end 14 of the main frame 12. The pivot shaft 52 extends through a transverse tube 56 fixed centrally in the pivot member 40, and between the pivot shaft 52 and inner surface of the tube 56 are cylindrical sleeves 57 of bearing material adapted to receive and hold grease (e.g., sleeves 57 of the bearing material commercially designated "Garlock DX bearing", that is commercially available from Glacier Garlock Bearing, Thorofare, N.J.), which sleeves 57 can be greased through a grease zerk in the transverse tube 56.

The wheeled support assembly thus both provides two large diameter wheels 26 (e.g., at least 48 inch or 122 cm diameter and preferably at least 60 inches or 152 cm diameter or as much as 72 inches or 183 cm) on each side of the main frame to help distribute the weight of the trailer spraying device 10, and allows the axes of the wheels 26 to be horizontally spaced a distance less than the diametrical dimension of the wheels 26 (i.e., preferably a distance in the range of 20 to 30 inches or 51 to 76 cm, such as 24 inches or 61 cm), which allows the two large wheels 26 on each pivot member 40 to sequentially move into and out of small ditches or over narrow ridges while reducing resulting unwanted pitching of the spray boom 22 compared to the pitching that occurs using only a single large wheel on each side of the main frame 12. Also, because the two large wheels 26 are mounted on the opposite sides 44 and 45 of each pivot member 40, the four wheels 26 move along four parallel spaced paths which reduces the amount of localized field compaction caused by the wheels 26 compared to that which would occur if two wheels 26 moved along the same path. Also, the load on the bearing (i.e., the pivot shaft 52, sleeve 57 and tube 56) by which the center portion 43 of the pivot member 40 is mounted on the elongate support member 38 is generally balanced along its axis, rather than being subject to torque along its axis that would result if both of the wheels 26 were mounted along the same side 44 or 45 of the pivot member 40.

Each wheel 26 is of conventional construction including a rim 60 supporting a tubeless air inflated tire 61 about its periphery (e.g., a 320/85 R38 tire with lugs around its periphery with a 60 inch or 152 centimeter diameter or the even larger 14.9R46 lugged tire with a 72 inch or 183 centimeter diameter) and having a central opening receiving one of the conventional hubs 49 supported by roller bearings on one of the conventional spindles 48, to which hub 49 the rim 60 is removably fastened by a circular array of bolts 64.

Figure 3:
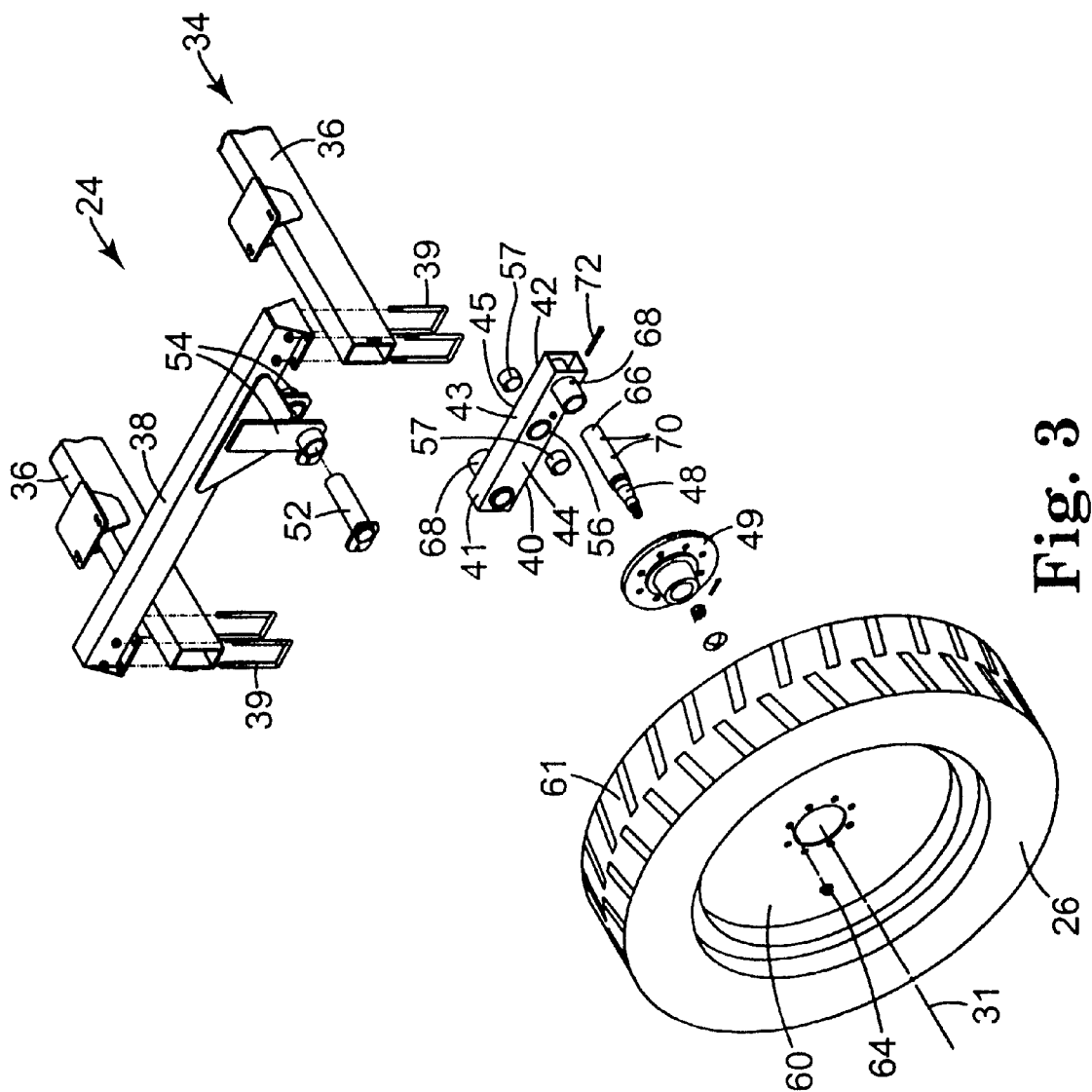
FIG. 3 is an enlarged fragmentary exploded view of the wheeled support assembly for the trailer agricultural spraying device of FIG. 1.

The wheeled support assembly 24 includes means for adjusting the spacing of the wheels 26 in a direction parallel to their axes so that the wheels 26 can be properly spaced to travel between crop rows spaced either at 22 inches or 56 cm, or at 30 inches or 76 cm. The spindles 48 projecting from the sides 44 and 45 of the pivot members 40 on which are supported bearings supporting the hubs 49 of the wheels 26 include support portions 66 extending through transverse tubes 68 welded between side walls of the pivot members 40 (see FIG. 3). Those support portions 66 and transverse tubes 68 have spaced transverse bores 70, some of which will be aligned to receive bolts 72 to hold the spindles 48 at the appropriate positions to provide proper spacing of the wheels 26 to travel between crop rows spaced at 22 inches or 56 cm, and others of which will be aligned to receive bolts to hold the spindles 48 at the appropriate positions to provide proper spacing of the wheels 26 to travel between crop rows spaced at 30 inches or 76 cm. In either case, the spindles 48 are positioned to project the same distance from the adjacent side 44 or 45 of the pivot members 40 to help equalize the load along the axes of the bearings on which the central portions 43 of the pivot members 44 are mounted.

The main frame 12, the tank 18, the spray boom 22, the means for mounting the spray boom 22 on the main frame 12, the means for spraying liquid from the tank 18 through the spray boom 22 in a predetermined pattern, and the means on the main frame 12 adapted to connect the front end 13 of the main frame 12 to a drive assembly such as a farm tractor adapted to tow the trailer spraying device 10 over the surface of a field can be the same as those used on the model 670 Trailer Sprayer with a 1,200 gallon tank commercially available from Redball, LLC, Benson, Minn., or the model 680 Trailer Sprayer with a 1,600 gallon tank also available from Redball, LLC, both of which Trailer Sprayers have been commercially available for over one year.

The present invention has now been described with reference to one embodiment and several possible modifications thereof. It will be apparent to those skilled in the art that many changes can be made in the embodiment described above without departing from the scope of the present invention. Thus, the scope of the present invention should not be limited to the structures described in this application, but only by the structures described by the language of the claims and the equivalents thereof.

What is claimed is:

1. A trailer spraying device comprising:
   a main frame having front and rear ends and opposite sides extending in a first direction between said ends;
   a tank mounted on said main frame for storing a quantity of liquid;
   a spray assembly mounted on said main frame comprising a spray boom projecting from said opposite sides of said main frame and means for spraying liquid from said tank through said spray boom in a predetermined pattern;
   means on said main frame adapted to connect the front end of said main frame to a drive assembly adapted to tow the spraying device over the surface of a field; and
   a wheeled support assembly including four wheels having predetermined diametrical dimensions, and mounting means for mounting two of said wheels along each of said opposite sides of said frame for rotation about axes at right angles to said first direction with the peripheries of said wheels positioned to contact the surface of a field over which the trailer spraying device is positioned so that the wheels support the main frame above the surface of the field and rotate to facilitate movement of the trailer spraying device over the field in said first direction, said mounting means including
   a rigid wheel adapting frame fixed to said main frame and comprising two elongate support members each spaced from a different one of the sides of said main frame to provide wheel clearance spaces between said elongate support members and the sides of said main frame each adapted to receive one of said wheels;
   two elongate pivot members, each of said pivot members having spaced first and second end portions, a central portion between said end portions, and opposite sides;
   means on each of said pivot members mounting two of said wheels on said pivot member for rotation about parallel axes transverse of said pivot member, one of said wheels being mounted on said first end portion on one of said sides of said pivot member, and the other of said wheels being mounted on the second end portion on the other of said sides of said pivot member, said parallel axes about which said wheels are rotatably mounted being spaced by a distance less than the diametrical dimensions of said wheels; and
   means for mounting the center portion of each of said pivot members on a different one of said elongate support members for pivotal movement of said pivot member about an axis parallel to said parallel axes about which said wheels are rotatably mounted with one of said wheels in said wheel clearance space, and the other of the wheels on the side of said elongate support member opposite said main frame.

2. A trailer spraying device according to claim 1 wherein said diametrical dimensions of said wheels are at least 48 inches or 122 cm, and said parallel axes about which said wheels are rotatably mounted on said pivot member are spaced by a distance in the range of about 20 to 30 inches or 50 to 76 cm.

3. A trailer spraying device according to claim 1 wherein said diametrical dimensions of said wheels are at least about 60 inches or 152 cm, and said parallel axes about which said wheels are rotatably mounted on said pivot member are spaced by a distance in the range of about 20 to 30 inches or 50 to 76 cm.

4. A trailer spraying device according to claim 1 wherein said diametrical dimensions of said wheels are at least about 60 inches or 152 cm, and said parallel axes about which said wheels are rotatably mounted on said pivot member are spaced by a distance of about 24 inches or 61 cm.

5. A trailer spraying device according to claim 1 wherein said wheeled support assembly includes means for adjusting the spacing of the wheels in a direction parallel to said axes so that the wheels can be properly spaced at positions to travel between crop rows spaced either at 22 inches or 56 cm, or at 30 inches or 76 cm.

6. A trailer spraying device according to claim 5 wherein said means for adjusting the spacing of the wheels in a direction parallel to said axes spaces the wheels at equal distances from the adjacent sides of the pivot members in both of said positions.

7. A wheeled support assembly adapted for use on a trailer spraying device said trailer spraying device comprising a main frame having front and rear ends and opposite sides extending in a first direction between said ends; a tank mounted on said main frame for storing a quantity of liquid; a spray assembly mounted on said main frame comprising a spray boom projecting from said opposite sides of said main frame and means for spraying liquid from said tank through said spray boom in a predetermined pattern; and means on said main frame adapted to connect the front end of said main frame to a drive assembly adapted to tow the spraying device over the surface of a field;

said wheeled support assembly including four wheels having predetermined diametrical dimensions, and mounting means adapted for mounting two of said wheels along each of said opposite sides of said frame for rotation about axes at right angles to said first direction with the peripheries of said wheels positioned to contact the surface of a field over which the trailer spraying device is positioned so that the wheels support the main frame above the surface of the field and rotate to facilitate movement of the trailer spraying device over the field in said first direction, said mounting means including a rigid wheel adapting frame adapted to be fixed to said main frame and comprising two elongate support members each adapted to be spaced from a different one of the sides of said main frame to provide wheel clearance spaces between said elongate support members and the sides of said main frame each adapted to receive one of said wheels;

two elongate pivot members, each of said pivot members having spaced first and second end portions, a central portion between said end portions, and opposite sides;

means on each of said pivot members mounting two of said wheels on said pivot member for rotation about parallel axes transverse of said pivot member, one of said wheels being mounted on said first end portion on one of said sides of said pivot member, and the other of said wheels being mounted on the second end portion on the other of said sides of said pivot member, said parallel axes about which said wheels are rotatably mounted being spaced by a distance less than the diametrical dimensions of said wheels; and means for mounting the center portion of each of said pivot members on a different one of said elongate support members for pivotal movement of said pivot member about an axis parallel to said parallel axes about which said wheels are rotatably mounted with one of said wheels in said wheel clearance space, and the other of the wheels on the side of said elongate support member opposite said main frame.

8. A wheeled support assembly according to claim 7 wherein said diametrical dimensions of said wheels are at least 48 inches or 122 cm, and said parallel axes about which said wheels are rotatably mounted on said pivot member are spaced by a distance in the range of about 20 to 30 inches or 50 to 76 cm.

9. A wheeled support assembly according to claim 7 wherein said diametrical dimensions of said wheels are at least about 60 inches or 152 cm, and said parallel axes about which said wheels are rotatably mounted on said pivot member are spaced by a distance in the range of about 20 to 30 inches or 50 to 76 cm.

10. A wheeled support assembly according to claim 7 wherein said diametrical dimensions of said wheels are at least about 60 inches or 152 cm, and said parallel axes about which said wheels are rotatably mounted on said pivot member are spaced by a distance of about 24 inches or 61 cm.

11. A wheeled support assembly according to claim 7 further including means for adjusting the spacing of the wheels in a direction parallel to said axes so that the wheels can be properly spaced to travel between crop rows spaced either at 22 inches or 56 cm, or at 30 inches or 76 cm.

12. A wheeled support assembly according to claim 11 wherein said means for adjusting the spacing of the wheels in a direction parallel to said axes spaces the wheels at equal distances from the sides of the pivot members in both of said positions.

* * * * *